United States Patent [19]

Hileman et al.

[11] Patent Number: 4,531,961
[45] Date of Patent: Jul. 30, 1985

[54] MODULAR SECTION MOLDING PRESS AND MOLD CLAMPING AND ARTICLE REMOVAL MECHANISM THEREFOR

[75] Inventors: Kenneth R. Hileman, Anderson; Ronald H. Shields; Lance M. Tobey, both of Alexandria, all of Ind.

[73] Assignee: Lynch Machinery, Anderson, Ind.

[21] Appl. No.: 518,529

[22] Filed: Jul. 29, 1983

[51] Int. Cl.³ .............................................. C03B 9/40
[52] U.S. Cl. ...................................... 65/164; 65/163; 65/225; 65/260; 65/304; 65/360
[58] Field of Search ............... 65/223, 225, 226, 163, 65/164, 260, 304, 360

[56] References Cited

U.S. PATENT DOCUMENTS

| | | | |
|---|---|---|---|
| Re. 28,073 | 9/1974 | Trudeau | 65/304 |
| Re. 28,759 | 4/1976 | Bystrianyk et al. | 65/207 |
| 1,835,570 | 12/1931 | Lorenz | 65/260 X |
| 1,911,119 | 5/1933 | Ingle | 49/5 |
| 1,959,894 | 5/1934 | Bartusch | 65/223 |
| 2,267,236 | 12/1941 | Goodrich | 49/5 |
| 2,810,236 | 10/1957 | Mumford | 49/5 |
| 2,926,457 | 3/1960 | Trudeau | 49/5 |
| 2,984,047 | 5/1961 | Mennitt et al. | 49/5 |
| 3,069,860 | 12/1962 | Colchagoff et al. | 60/97 |
| 3,147,102 | 9/1964 | Trudeau | 65/225 |
| 3,198,617 | 8/1965 | Denman et al. | 65/223 X |
| 4,375,979 | 3/1981 | Newkirk et al. | 65/360 |

*Primary Examiner*—Arthur Kellogg
*Attorney, Agent, or Firm*—Allegretti, Newitt, Witcoff & McAndrews, Ltd.

[57] ABSTRACT

Apparatus for manufacturing molded articles includes a plurality of mold section presses. A mold slide carriage of each press moves a mold among charge receiving, molding, and extraction stations. A charge is guided to the mold while at the receiving station by a trough, from a rotatable scoop. A mold clamp mechanism of drivable arms linked to the mold and wedgeable against cam blocks maintains the mold closed during molding. A mold plunger driven by a press head assembly mates the mold. A molded article is kicked up by a kick-up mechanism. A take-out mechanism rotates jaw members about two axes to grasp molded articles at the extraction station, lifting them to an article removal station.

13 Claims, 19 Drawing Figures

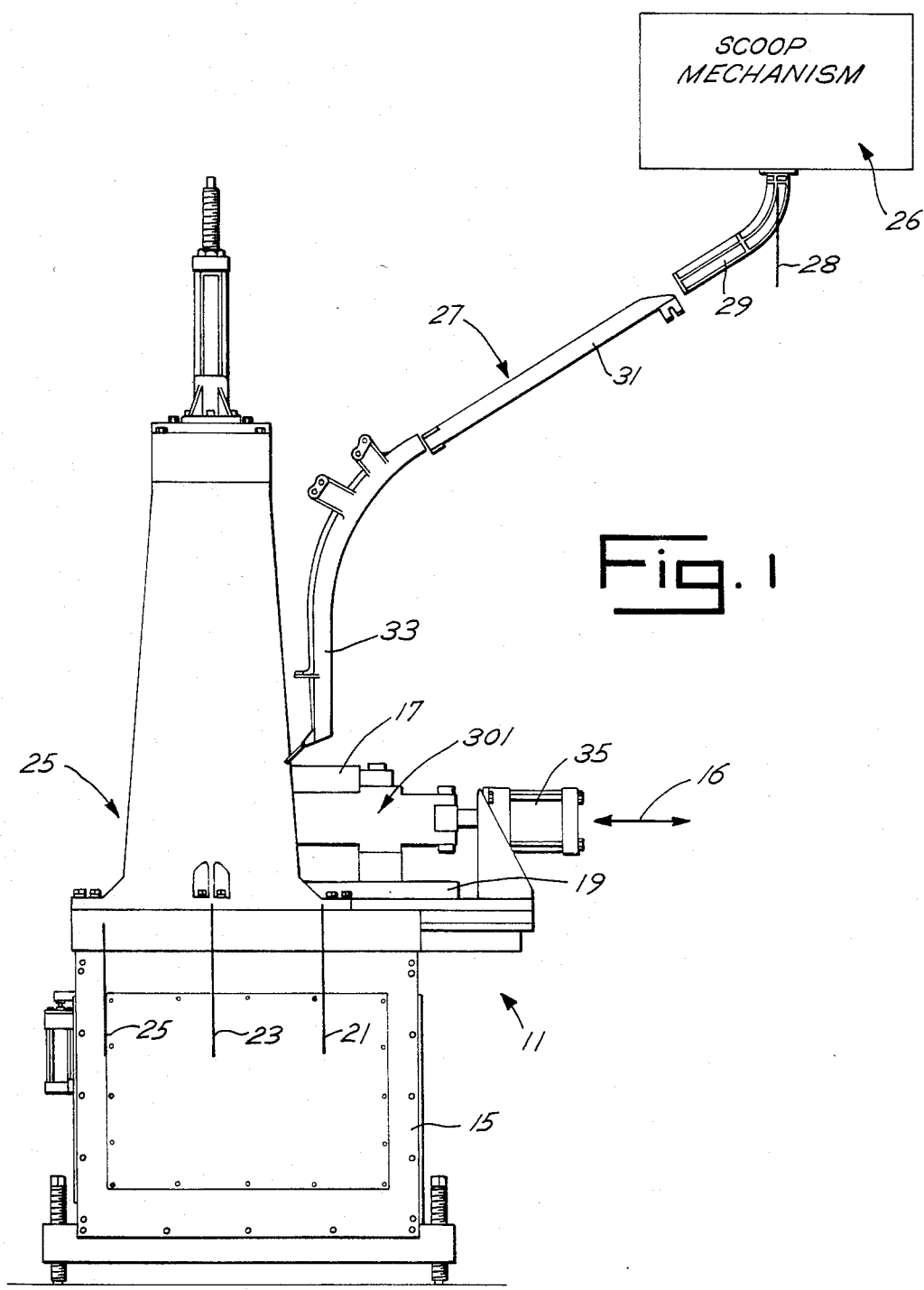

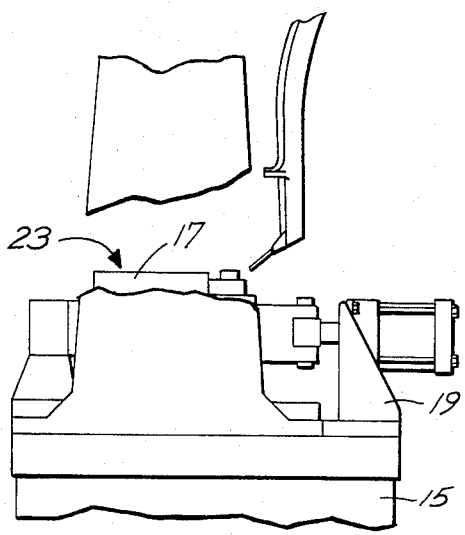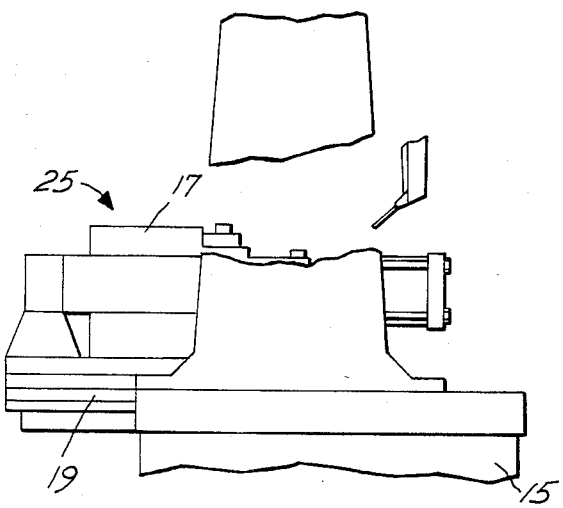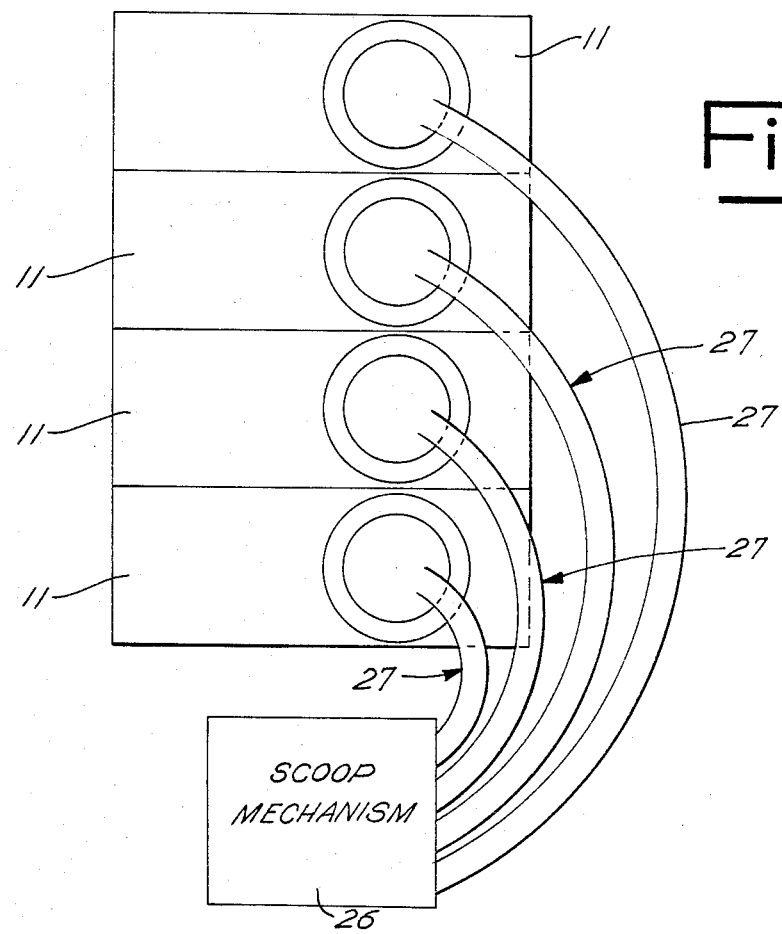

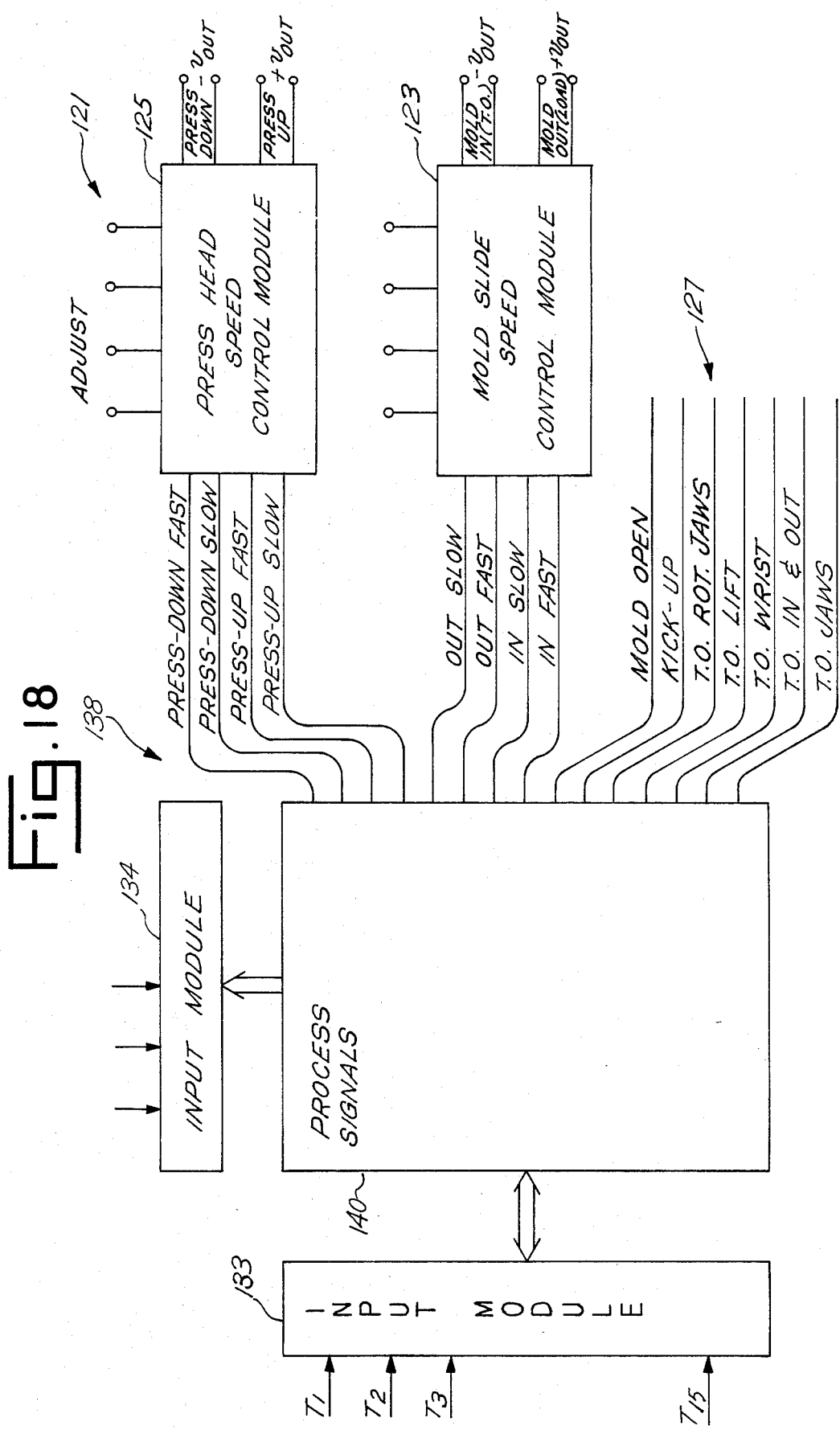

MODULAR SECTION MOLDING PRESS AND MOLD CLAMPING AND ARTICLE REMOVAL MECHANISM THEREFOR

BACKGROUND AND FIELD OF THE INVENTION

1. Field Of The Invention

This invention relates to apparatus for manufacturing molded glass articles comprising a plurality of modular section molding presses. More particularly, the invention relates to such apparatus in which the articles are molded in molds which are synchronously movable to multiple work stations.

The invention also relates to a mold clamping mechanism and an article removal mechanism for such apparatus.

2. Description Of The Prior Art

In this type of machine, individual section presses are arranged side-by-side in a row. Each section press has one or more molds, each of which includes an upwardly opening cavity for receiving a charge of molten glass. The molten charges are pressed and thereby molded into finished articles. The finished articles are removed from the molds and placed upon a suitable conveyor or other article receiving mechanism.

Heretofore, complex guide structures have been utilized for delivering mold charges to the mold cavities and then clearing the guide structures from the cavity areas in order to permit mold plungers to move into the molds to form the finished articles. See, for example, U.S. Pat. No. 2,267,236 issued to L. F. Goodrich on Dec. 23, 1941. Also, see U.S. Pat. No. 2,810,236 issued to E. H. Mumford on Oct. 22, 1957.

Also, the clamping mechanisms of known section presses have relied upon air or hydraulic pressure to hold split molds closed. The article removal mechanisms of such presses having been both complex and lacking in versatility.

SUMMARY OF THE INVENTION

An object of the inventors which led to this invention was to provide a simple, efficient apparatus affecting continuous delivery by gravity of mold charges of molten glass to each of a plurality of modular section presses, in sequence and in a predetermined order.

Another object was to provide charge guiding structure at a location displaced from the section presses to permit free access to the mold cavities by the mold plungers of the presses.

Another object was to provide a section press with a movable mold carriage for movement of a mold or molds among multiple work stations.

A further object was to provide an automatically self-locking mold clamping mechanism for a section press.

A still further object was to provide a versatile article removal mechanism for a section press.

These and other objects of the present invention are accomplished in a machine constructed from a plurality of independent section presses, the operation of each of which is controlled in synchronism with a single feeder. The feeder discharges individual mold charges successively to the section presses in a predetermined order. The mold cavity of each section press is mounted atop a slidable carriage which is controlled for movement between a charge receiving station, a press mold station and an article removal station. Guide structure conducts the charges from the feeder outlet to each of the charge stations in succession, a clamping mechanism for each mold clamps each mold securely closed, the articles are formed at molding stations, and an article removal mechanism removes the finished articles from the molds. The slidable carriage, press plungers, clamping mechanisms and removal mechanisms are all controlled in conjunction with the charge distributing structure, to assure high speed, automatic operation.

Other objects, advantages and aspects of the invention, especially as to the clamping and removal mechanisms, will become understood from the detailed description of the preferred embodiment of the invention, which follows a brief description of the drawing.

BRIEF DESCRIPTION OF THE DRAWING

The preferred embodiment of the invention will be described in relation to the accompanying drawing consisting of sixteen figures or FIGS., as follows:

FIG. 1 is a side view of a single press section, charge deflector structure and charge distributing mechanism of an embodiment of the present invention with the mold at a loading station;

FIG. 2a is a side view of a portion of the single press section of FIG. 1, depicting the mold moved to a molding station;

FIG. 2b is a side view of a portion of the single press section of FIG. 1, depicting the mold moved to an article removal station;

FIG. 3 is a block diagram of a top view of a plurality of press sections as in FIG. 1, arranged side-by-side in a row with a single charge distributing mechanism;

FIG. 18 is a third schematic view of the controls of the preferred embodiment of the invention.

DETAILED DESCRIPTION OF THE PREFERRED EMBODIMENT

Figure 4:
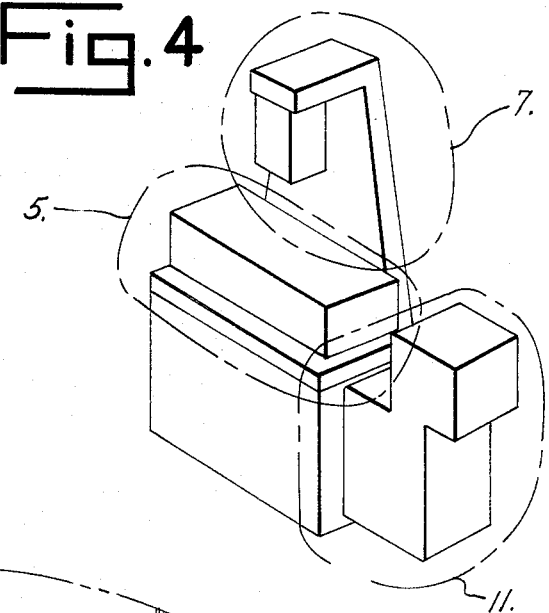
FIG. 4 is a block diagram of a perspective view of a single press section as in FIG. 1.

Referring to FIG. 1, a modular section press 11 includes a base structure 15. A mold 17 is slidably mounted atop the base 15, on a slide carriage 19. The slide carriage 19 moves the mold 17 horizontally, in the directions of arrow 16 in FIG. 1, within the section press 11. Beginning a cycle of operation, the slide carriage 19 has the mold 17 centered at a loading station 21, as in FIG. 1. The slide carriage 19 then moves the mold 17 in a first direction from the loading station 21 to a molding station 23, as in FIG. 2a. The slide carriage 19 then moves the mold 17 further in the first direction to an article removal station 25, as in FIG. 2b. The carriage 19 then returns the mold 17 in the direction opposite the first direction to the loading station 21, as in FIG. 1.

A charge feeder or scoop mechanism 26 serially deposits molten charges of glass into a charge delivery assembly 27. A charge is guided into the mold 17 while the mold is at the loading station 21. The delivery assembly 27 includes a trough 31 and a deflector 33 which are secured in fixed positions relative to the press 11. A scoop 29 is rotatable about a center line 28 for movement to the trough 31 to deliver a charge into the trough 31. The scoop 29 permits adjustment of the path of the charge for guiding the charge away from the mold 17 on an emergency basis in the event of a press breakdown. For example, the scoop 29 may be pivoted away from the trough 31 for directing the charge into a cullet chute (not shown) or the like.

As shown in FIG. 3, four modular section presses 11, each as illustrated in FIG. 1, are arranged side-by-side in a single row. A maximum of eight presses may be placed in such a row. A single scoop mechanism 26 rotates its scoop 29 into alignment with each delivery assembly 27 of each press 11 for successive deposit of a charge into each mold 17.

Referring again to FIG. 1, a mold clamp cylinder 35 is positioned atop the slide carriage 19 in a fixed relation with the mold 17. The cylinder 35 drives a clamping mechanism 301 (shown in FIGS. 5 and 6) to close the mold 17 in preparation to receive each successive charge at the loading station 21. The cylinder 35 and clamping mechanism 301 then hold the mold 17 securely closed during molding at the molding station 23. The cylinder 35 then again drives the clamping mechanism 301, to open the mold to permit removal of the molded article at the article removal station 25.

Figure 5:
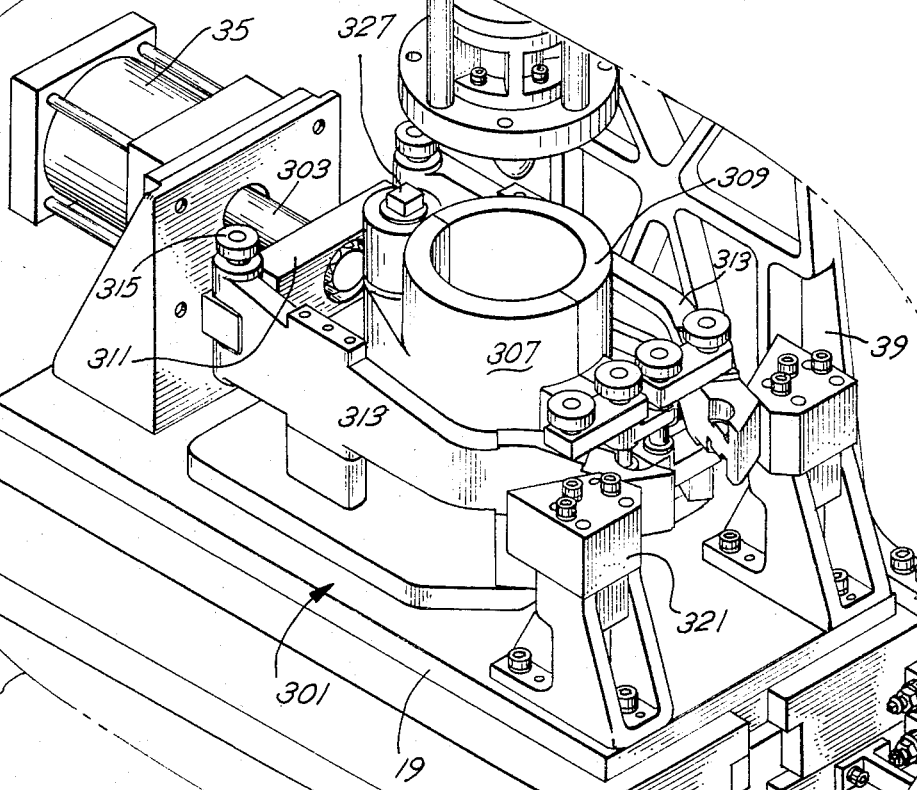
FIG. 5 is a perspective view of a carriage and a clamping mechanism of the press section of FIG. 1, located in the area outlined by line 5 in FIG. 4.
Figure 7:
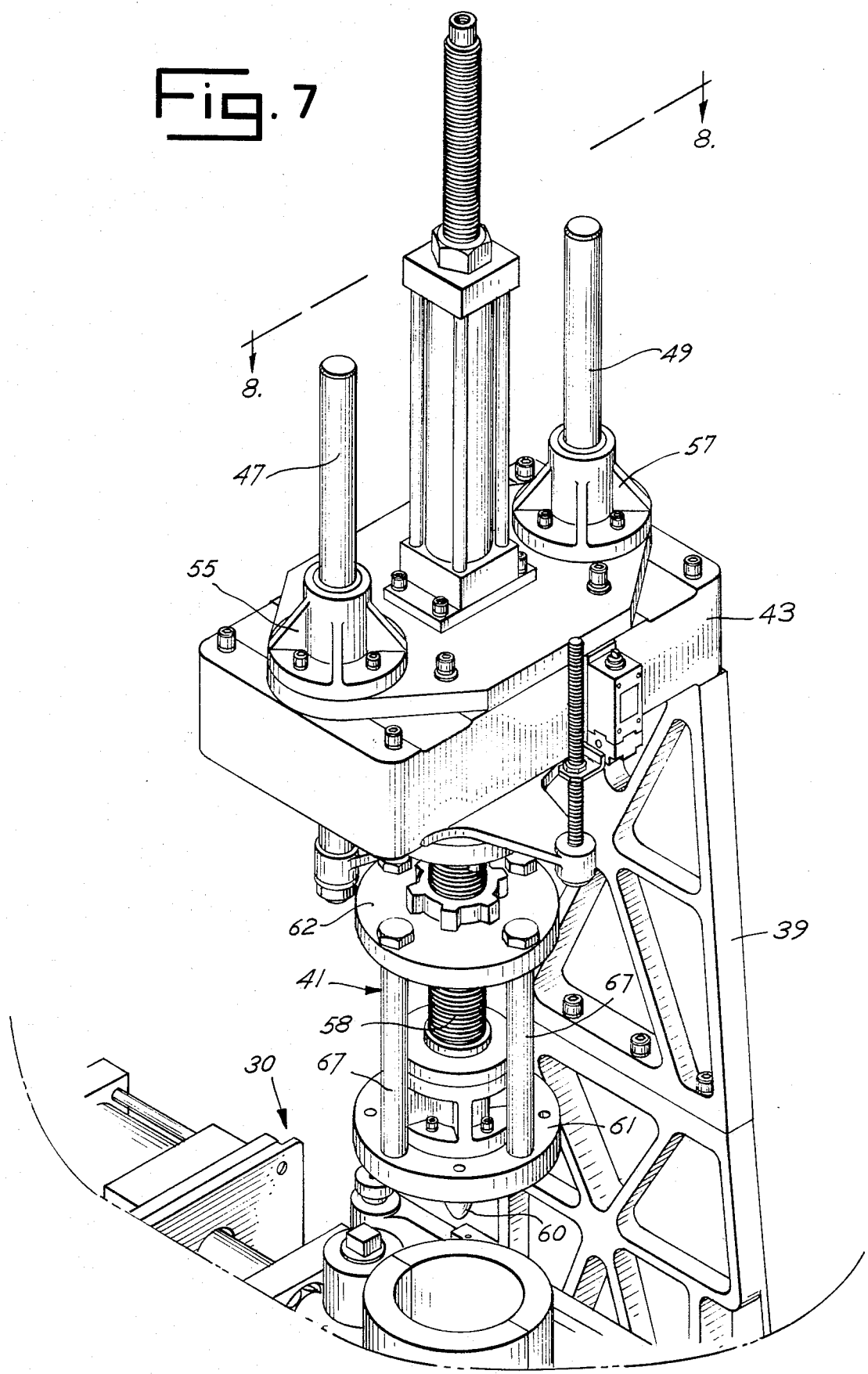
FIG. 7 is a perspective view of a press tower of the press section of FIG. 1, located in the area outlined by line 7 in FIG. 4.
Figure 8:
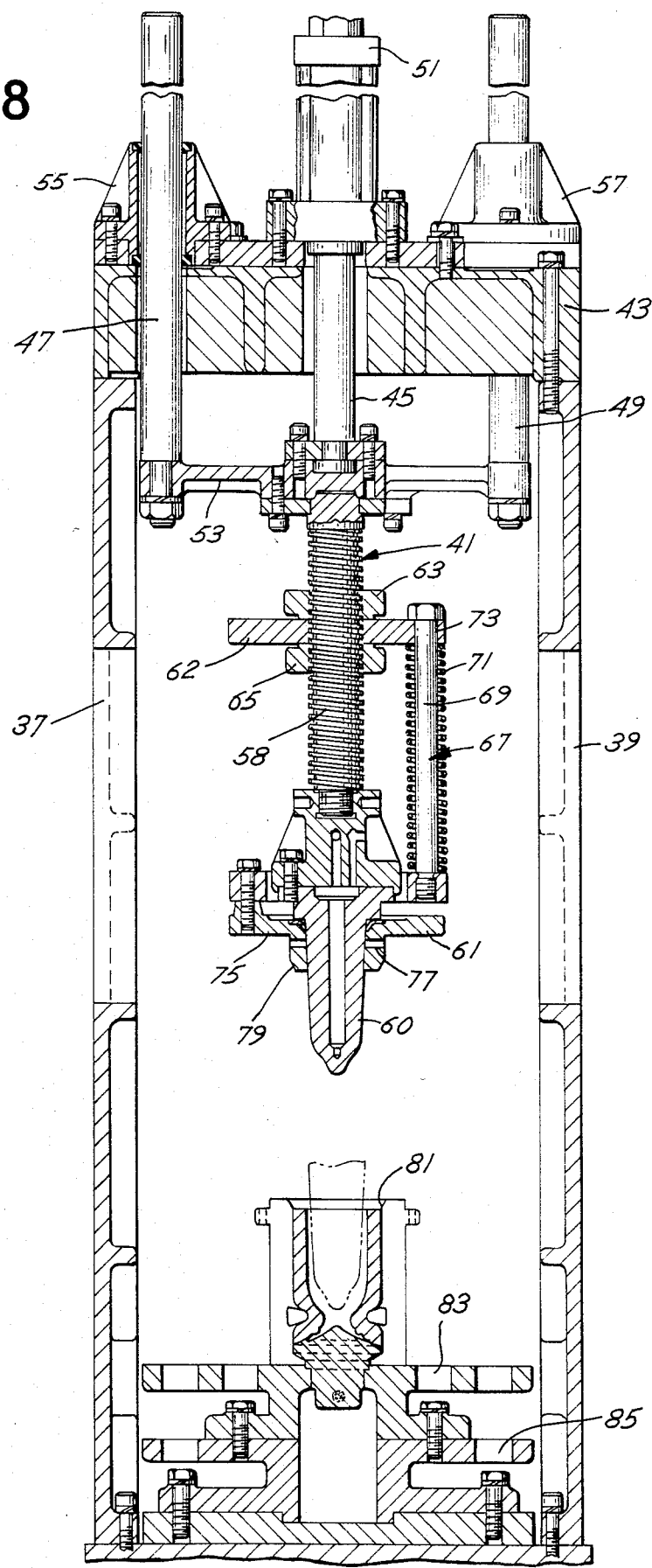
FIG. 8 is a cross-sectional side view of the press portion of the press section of FIG. 1, taken along lines 8—8 of FIG. 7.

Referring to FIG. 8, the press 11 includes two side support members 37, 39 atop the base structure 15, along the sides of the slide carriage 19. (FIGS. 4, 5 and 7 depict the member 37 removed—which is not intended during press operation—to show detail of the press 11.) A press head assembly 41 moves vertically between the support members 37, 39 at the molding station 23. A press head yoke 43 serves as a guide and support for the press head assembly 41, and is itself supported atop the side support members 37, 39. The press head yoke 43 spans the side members 37, 39 and is bolted in place.

The yoke 43 includes three cylindrical apertures through a central one of which passes a center piston rod 45, and through outer ones of which pass a pair of side guide rods 47, 49. An hydraulic cylinder 51 is bolted to the top of the press head yoke 43. The cylinder 51 drives the center piston rod 45 vertically upward and downward with respect to the press head yoke 43 to control the position of the press head assembly 41.

A press cross head 53 secures together the end of piston rod 45 and the ends of guide rods 47, 49 for conjoint movement. The guide rods 47, 49 are secured at the outer periphery of the press cross head 53 and are channeled through the press head yoke 43 for laterally orienting and stabilizing the press cross head 53 as the piston 45 moves vertically. As will suggest itself, the press head yoke 43 includes bracing components 55, 57 is bearings for guide rods 47, 49.

The cross head 53 carries the press head assembly 41 via a plunger rod 58. The plunger rod 58 is bolted to the press cross head 53 in axial alignment with the piston rod 45. The plunger rod 58 has attached to its end a mold plunger 60 of the head assembly 41.

An upper spring plate 62 and a lower spring plate 61 are axially spaced along the axis of the plunger rod 58. The plunger rod 58 is threaded, providing for the upper spring plate 62 to be held in a fixed position on the plunger rod 58 by a pair of threaded bolt members 63, 65.

Four spring members 67 (one is shown in FIG. 8) connect the upper spring plate 62 to the lower spring plate 61. The spring members 67 permit movement of the lower spring plate 61 relative to the upper spring plate 62. Each spring member 67 is formed of a rod 69 and a spring 71. The rod 69 is slidable in a bearing 73 formed in the upper spring plate 62 and is threadably secured to the lower spring plate 61. Thus, the lower spring plate 61 may move upwardly against the bias of the spring 71 driving the rod 69 through the upper spring plate 62.

A mold cap plate 75 is bolted in four places (one is shown in FIG. 8) to the underside of the lower spring plate 61. The mold cap plate 75 includes a cylindrical portion 77 having a tapered face 79 which mates with a chamfered face 81 of the mold 17.

In operation, the cylinder 51 is hydraulically actuated, moving the press head assembly 41 downwards and mating the mold plunger 60 with the mold 17 at the mold station 23. The assembly 41 moves downward until the mold cap plate 75 engages the mold 17. The mold plunger 60 continues to move within the mold 17 after the faces 79, 81 mate, for a short distance controlled by the force of the spring members 71. After formation of an article in the mold 17, the cylinder 51 retracts the press head assembly 41, thereby retracting the mold plunger 60 from the mold 17. To properly cooperate with the mold plunger 60, the mold 17 is height positioned by spacers such as the pair 83, 85, which are bolted together, to the mold 17, and to the slide carriage 19.

The mold 17 is an open-and-shut split mold for use with the cylinder 35, as discussed above. Referring to FIG. 5, the mold 17 is formed of two half portions 307, 309. The mold halves 307, 309 are pivoted about a center tapered pin 327.

Figure 6:
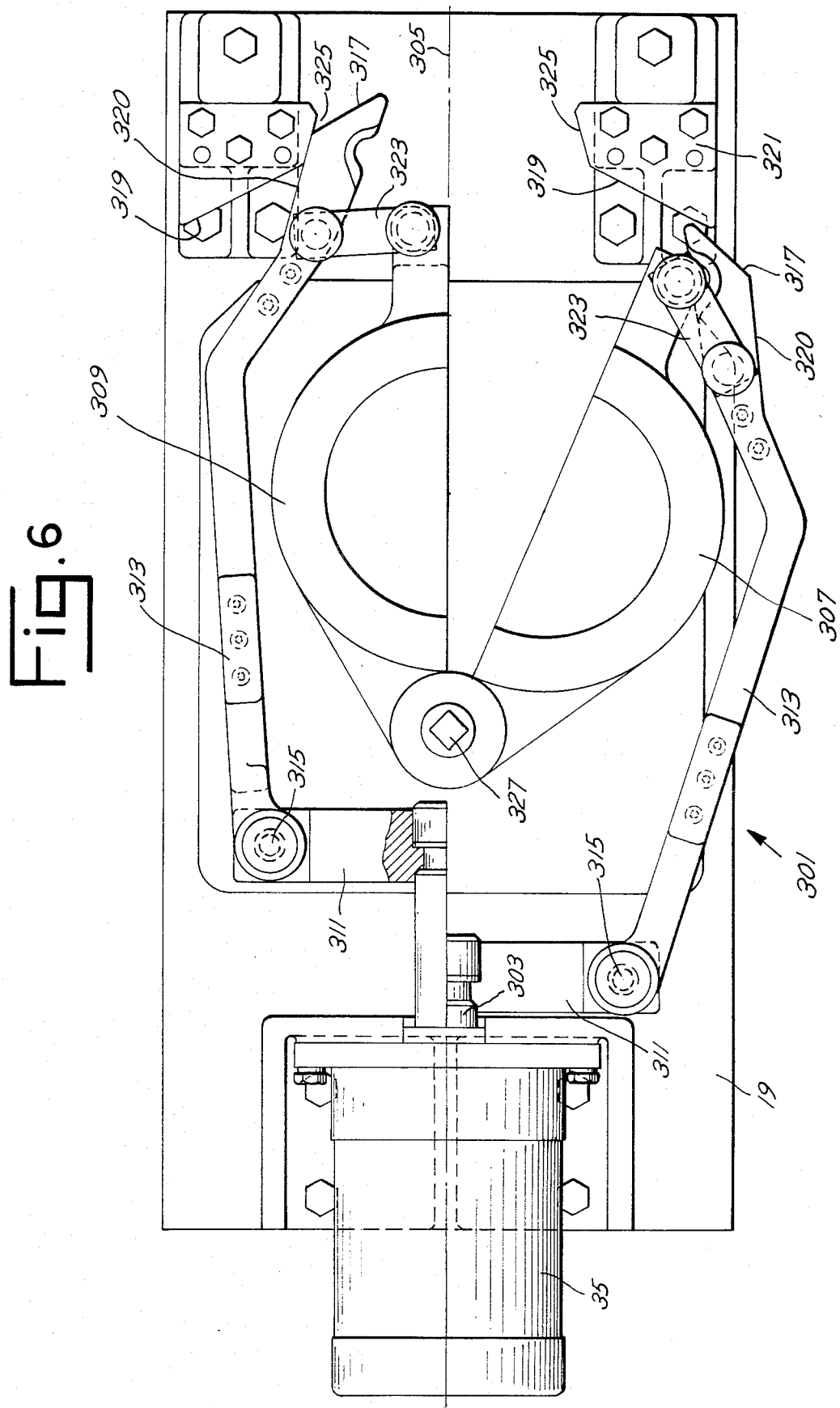
FIG. 6 is a top plan view of the slide carriage and clamping mechanism split along its center line to illustrate two positions of the clamping mechanism, one above the center line and one below.

Referring to FIGS. 5 and 6, the clamp cylinder 35 includes a drive rod 303 for movement of the clamping mechanism 301 to a first, mold closed position, as shown in FIG. 5 and in FIG. 6 above a centerline 305 of the clamping mechanism 301, and to a second, mold open position, as shown in FIG. 6 below the centerline 305. The piston rod 303 is secured to a lateral drive arm 311 which in turn is coupled to two opposed, curved drive arms 313 via hinge pins 315. The arms 313 pivot about the pins 315 during opening and closing of the mold 17.

As shown in the lower portion of FIG. 6, each curved drive arm 313 includes a camming surface 317 located at its outer end for sliding engagement with a cam surface 319 formed on the face of a cam block 321. Each mold half 307, 309 is connected to a curved arm 313 by connecting members or links 323. Each connecting member 323 is pivotally mounted at each of its ends to an arm 313 and the free end of a mold half 307 or 309, as shown.

As the piston rod 303 moves outwardly from the cylinder 35 (to the right in FIGS. 5 and 6), each curved arm 313 engages a cam block 321. The engagement drives the outer end of each arm 313 towards the center line 305. As illustrated in FIG. 6 above the centerline 305, each drive arm 313 drives its outer end along a cam surface 317 fully across the cam block cam surface 319. A second drive arm cam and wedging surface 320 is then driven onto a second cam block cam surface 325. Each connecting member 323 is moved to the mold closed position as shown in FIG. 5 and the upper half of FIG. 6. In this position of the clamping mechanism 301, the arms 313 wedge against the cam blocks 321 under the forces of molding, to prevent movement of the links 323 and mold halves 307, 309, and thereby maintain the mold 17 securely closed.

Figure 9:
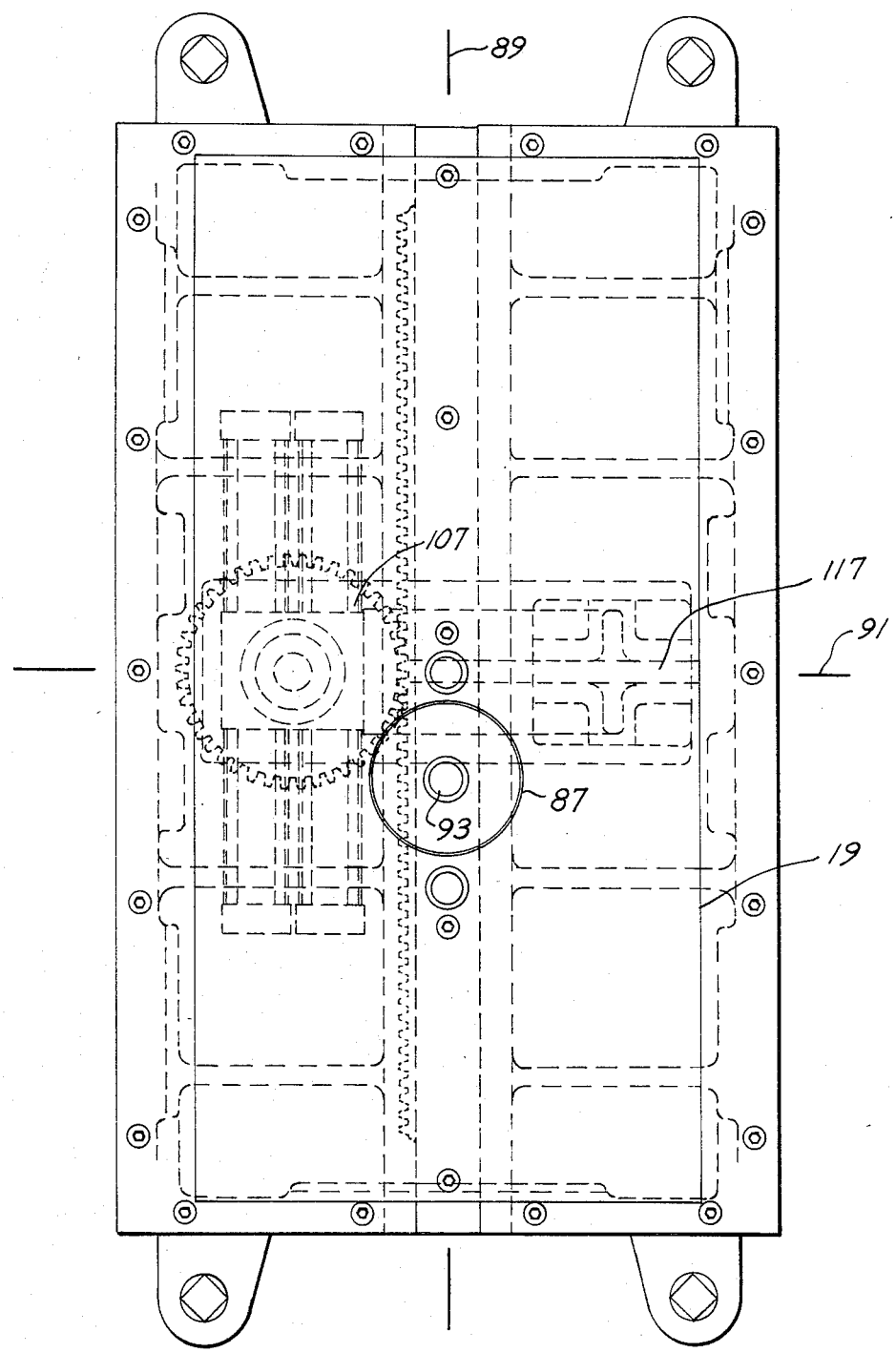
FIG. 9 is a top plan view of the slide carriage and base structure of the press section of FIG. 1, with the clamping mechanism removed.

Referring to FIG. 9, the slide carriage 19 is generally rectangular in shape having a pilot diameter aperture 87 formed along the longitudinal axis 89 of the carriage 19 just off center of its lateral axis 91 as shown. The aperture 87 receives the lower portion of the mold spacer 85 (FIG. 8) for fixing the position of the mold 17 relative to the carriage 19. A kickup hole 93, described hereinafter, passes through the center of the aperture 87, as shown.

Figure 10:
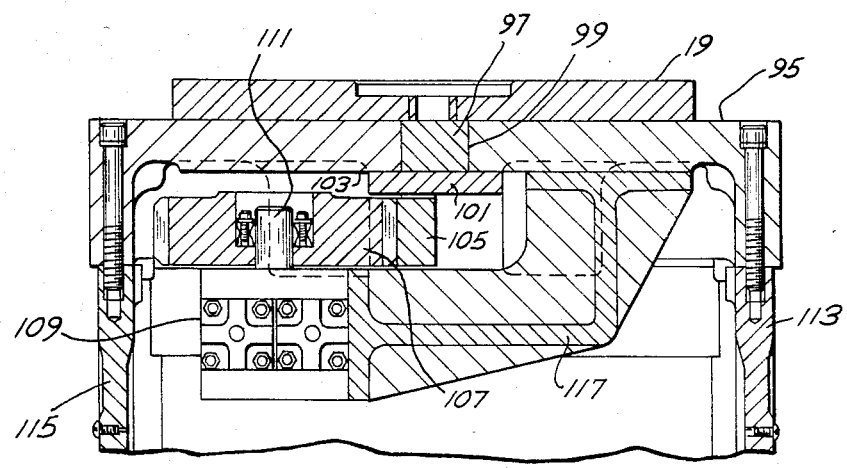
FIG. 10 is a partial cross-sectional view of the upper portion of the base structure of the press section of FIG. 1.

As best shown in FIG. 10, the carriage 19 is driven across the top of a platform member 95 which forms the top of the base section 15. A slide guide 97 is connected to and depends downwardly from the carriage 19 to center and align the carriage 19 relative to the platform member 95. The slide guide 97 is slidably mounted within a longitudinal slot 99 formed along the entire length of the platform member.

The slide guide 97 has a longitudinal length sufficient to maintain the longitudinal axis of the carriage parallel with the slot 99. A slide keeper 101 is secured to the bottom of the slide guide 97 and travels on the lower surface 103 of the platform member 95. As shown, the slide keeper 101 is wider in dimension than the slide guide 97 for maintaining the slide guide 97 in the slot 99.

A rack 105 is secured to the slide keeper 101 and cooperates with a pinion 107 for moving the carriage 19 relative to the base section 15. A hydraulic rotary actuator 109 has an axle 111 for rotating the pinion 107 for driving the slide carriage 19.

As shown in FIG. 10, the platform member 95 is bolted to base side members 113, 115 of the base section. A support brace 117 is connected to the lower surface 103 for supporting the rotary actuator 109, as shown. FIG. 9 illustrates a top view of the drive pinion 107 and its support brace 117.

Figure 13:
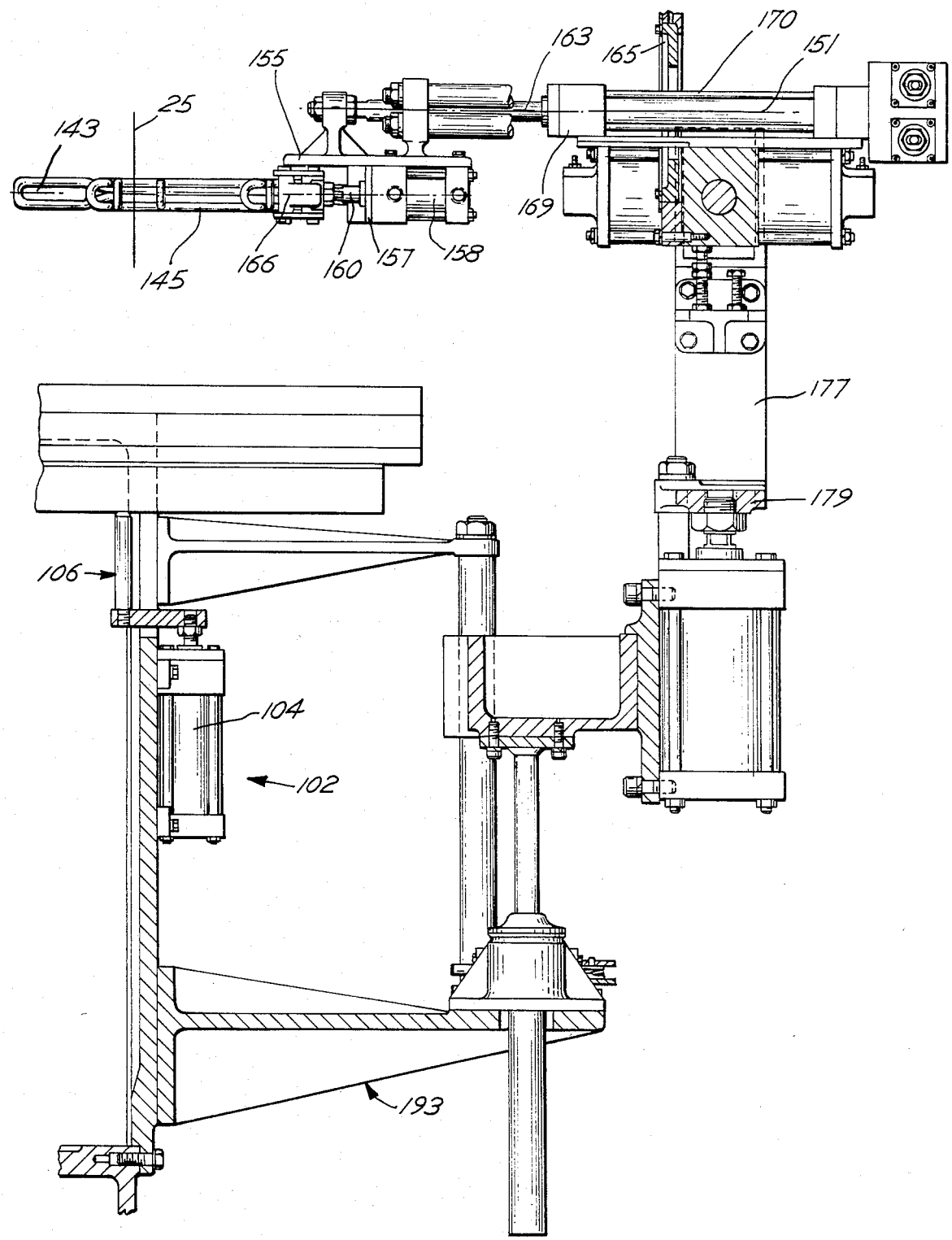
FIG. 13 is a side view of a portion of the take-out mechanism and a kickup mechanism of the press section of FIG. 1.

Referring to FIG. 13, a kick-up or article lifting mechanism 102 includes a pneumatic cylinder 104 mounted on the end of the base structure 15 adjacent the extraction station 25. The cylinder 104 drives a kick-up pin 106 for movement into and out of the kick-up hold 93 when the mold 17 is at the extraction station 25. The pin 106 moves into the kick-up hold 93 when an article has been molded, to loosen and lift the article from the mold 17.

Figure 11:
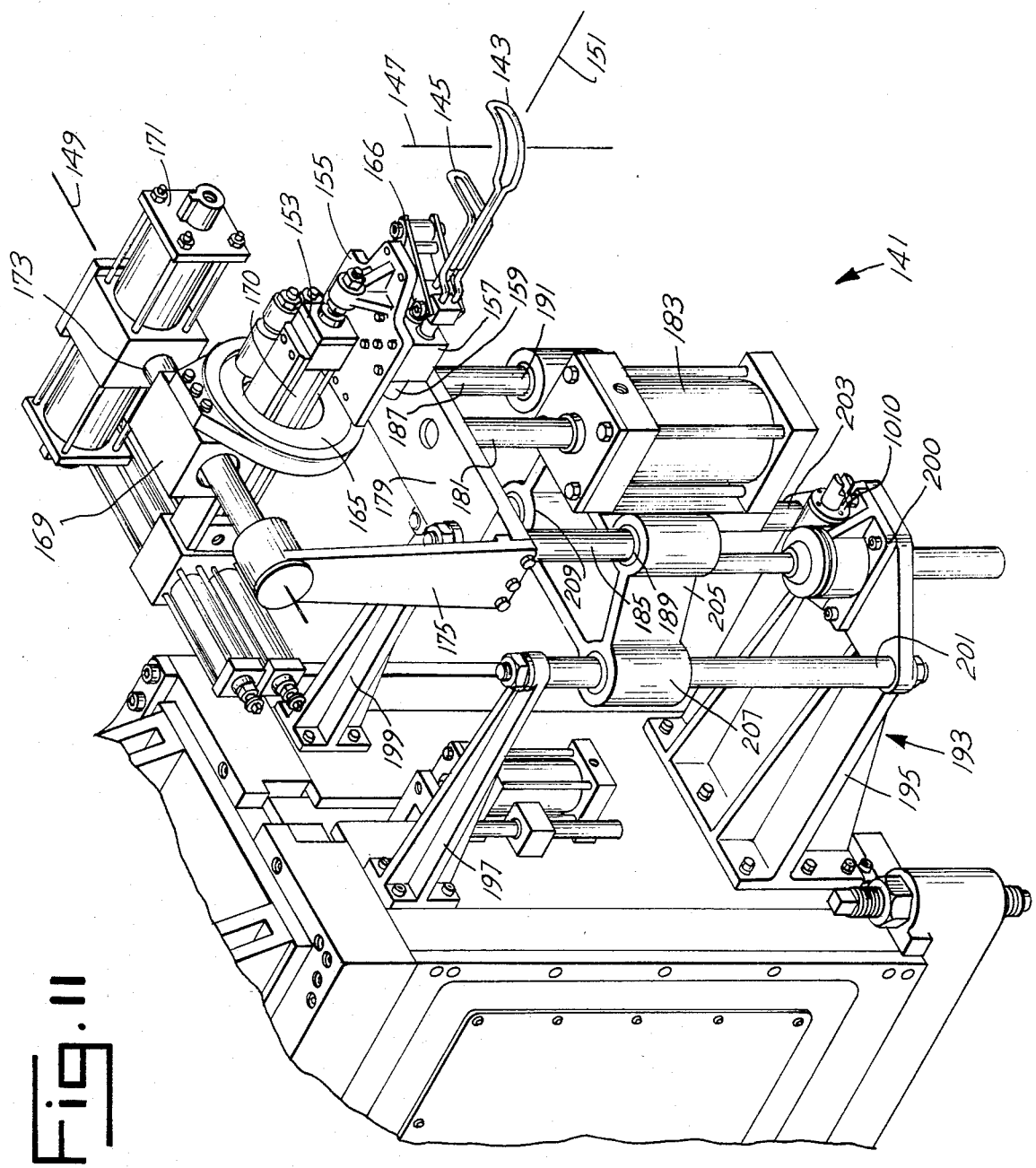
FIG. 11 is a perspective view of the take-out mechanism of the press section of FIG. 1, located in the area outlined by line 11 of FIG. 4.
Figure 12:
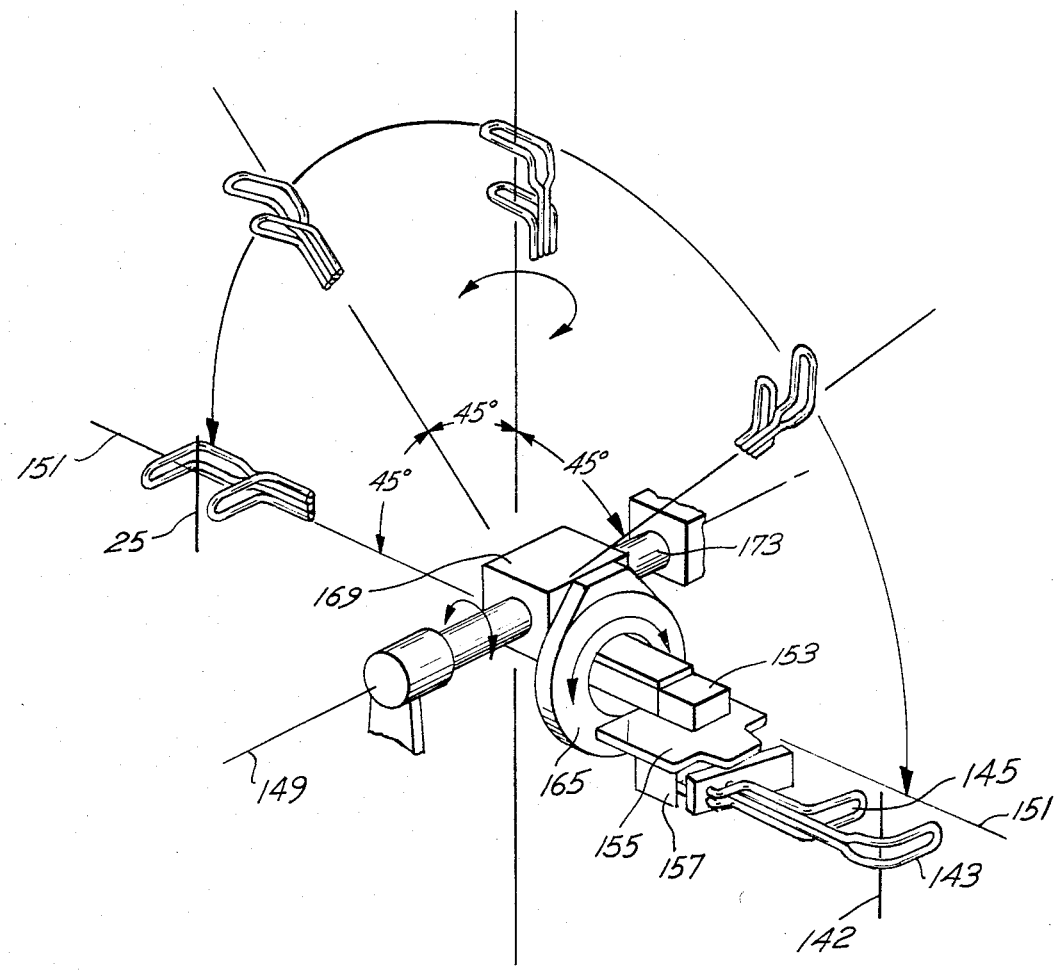
FIG. 12 is a diagrammatic view of a movement of the jaws of the take-out mechanism.

Referring to FIGS. 11-13, a take-out mechanism generally referred to as 141 includes a pair of jaw members 143, 145 which sequentially grasp and release molded articles. The jaw members are shown in FIG. 11 as occupying a position in an unloading station 147. The take-out mechanism 141 moves a molded article to the unloading station 147 from the extraction station 25 where the molded article is initially grasped by the jaw members 143, 145. The molded article may be placed onto a conveyor (not shown) at the unloading station 147 by release action of the jaw members 143, 145.

Referring especially to FIG. 12, the jaw members 143, 145 are rotated to the extraction station about a first axis of rotation 151 and, as most preferred, about a second, moving axis of rotation 149. With respect to the first axis of rotation 151, the jaw members 143, 145 are movable parallel to the axis 151 as well as rotatable thereabout. The jaw members 143, 145 are also slidable relative to each other, for the grasping and release of articles.

Figure 14:
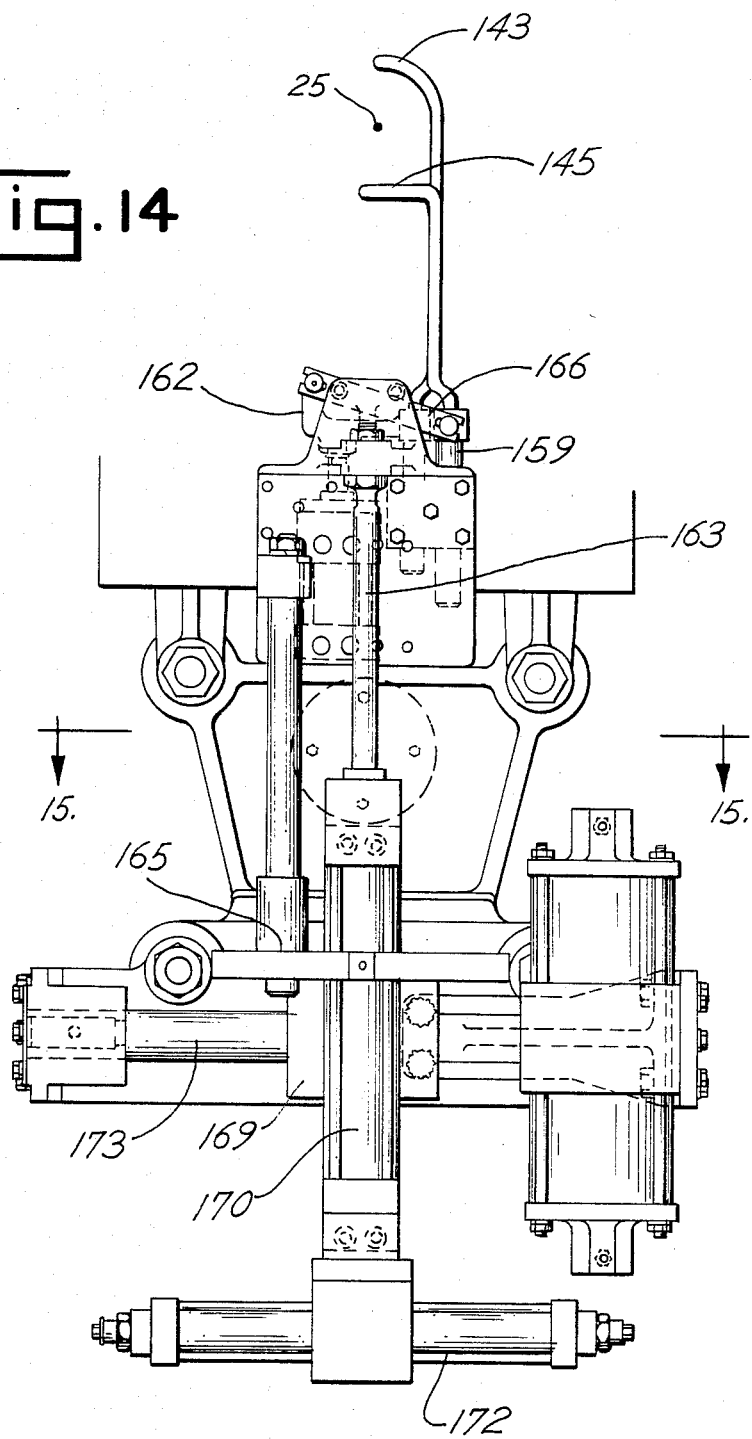
FIG. 14 is a top view of the take-out mechanism of the press section of FIG. 1.

To accomplish the grasping and release, a first rotational member 153 includes a platform 155 which carries on one of its sides a jaw member control 157, shown best in FIG. 13. The control 157 includes an air cylinder 158 having a drive rod 160. The drive rod 160 moves the jaw member 143 directly and simultaneously moves an L-shaped arm 162 (FIG. 14). The other jaw member 145 is driven in reverse by the motion of the arm 162, which motion is transmitted by a centrally pinned, pivotable or see-sawing lever arm 166. An extendable guide rod 159 guides the movement of jaw member 145, confining it to linear movement parallel to the movement of the jaw member 143. Because of the see-saw motion of the lever arm 166, the driving of the air cylinder 158 causes the jaw members 143, 145 to come together in a grasping action when the drive rod 160 is driven to full extension, and to separate in a releasing action when the drive rod 160 is driven to full retraction.

The platform 155 is mounted to a shaft 163 which is pneumatically movable parallel to its central axis 151 by a pneumatic cylinder 170. This permits movement of the jaw members 143, 145 along the axis 151. Because of the movement along the axis 151, the extraction station 25 and unloading station 147 need not be, and are not, the same distance from the axis 149 of the take-out mechanism 141.

Figure 15:
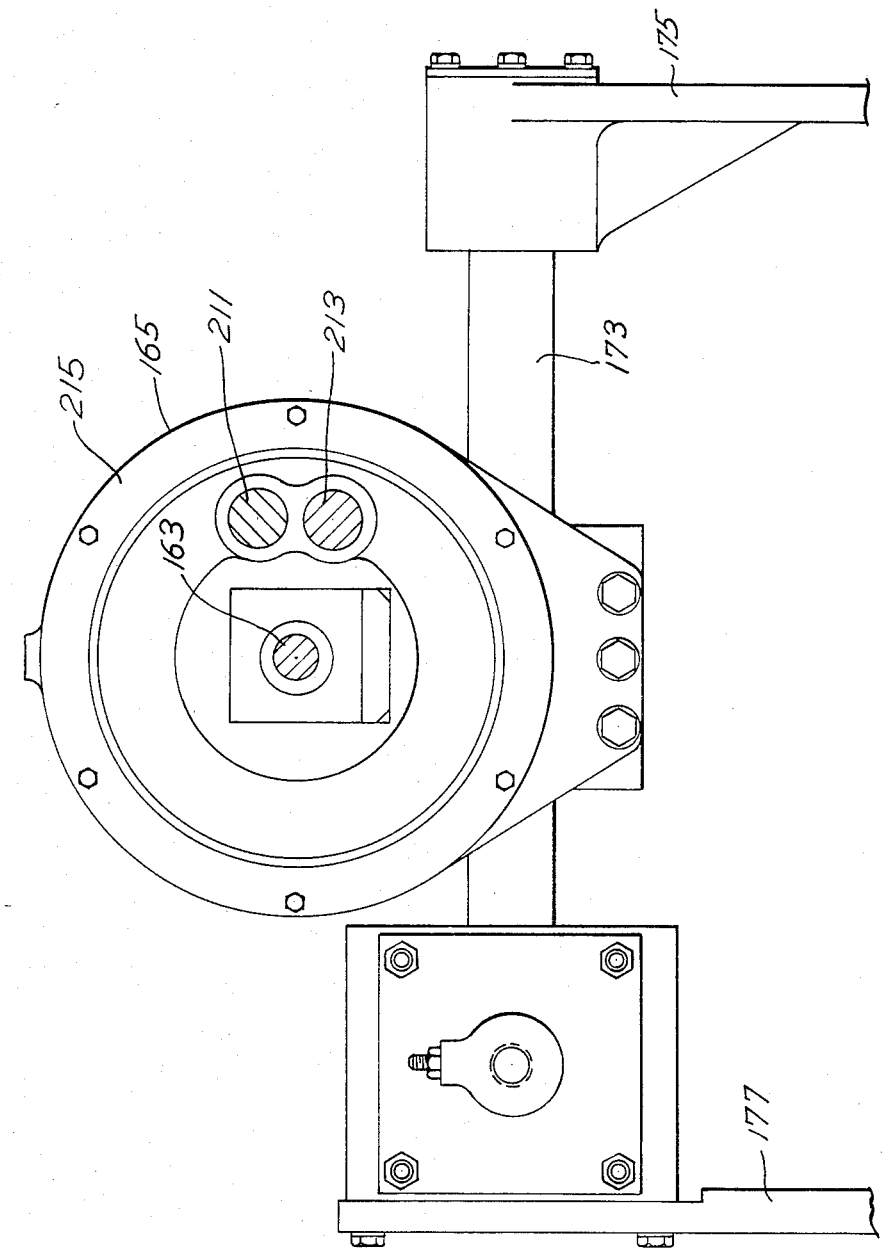
FIG. 15 is a cross-section view of the take-out mechanism of the press section of FIG. 1, taken along line 15—15 in FIG. 14.

The shaft 163 is rotated about the first axis 151 by another pneumatic cylinder assembly 172, mounted at the end of the shaft 163 opposite the jaw members 143, 145. The cylinder assembly 172 is a rack and pinion type, and rotates the shaft 163 180°. Rotation of the first rotational member 153, platform 155, control 157 and jaw members 143, 145 is stabilized by guide pins 211, 213, best shown in FIG. 15. The guide pins 211, 213 slidably connect the member 153 to a plate member 215. The plate member 215 revolves within a non-revolving support 165.

With respect to the second axis of rotation 149, the previously identified structure which controls both translational and rotational movement of the jaw members relative to the axis 151, is rotated as a unit about a shaft 173. The shaft 173 carries a support block 169 to which the circular support 165 is bolted. The shaft 173 is rotatable about the axis 149, being driven by a pneumatic cylinder 171. The cylinder 171 is located at one end of the shaft 173 as shown.

The shaft 173 is rotationally supported by a pair of upright arms 175, 177 which are held in a spaced-apart relationship by a base member 179. The arms 175, 177 and base member 179 are movable vertically as a unit by a shaft 181 driven by a pneumatic cylinder 183. A pair of guide rods 185, 187 serve to stablize the movement of the arms 175, 177 and the base member 179. The guide rods 185, 187 move through bearing members 189, 191 as the shaft 181 is driven by the cylinder 183.

A take-out mechanism support structure, generally referred to by reference numeral 193, includes support beams 195, 197 and 199 which are bolted to the side of the press base section 15 and extend outwardly therefrom as shown. The support beam 195 carries a platform 200 which supports a pair of support rods 201, 203. The rods 201, 203 are connected at their upper ends to the support beams 197, 199, respectively. A support frame 205 is slidably mounted on the support rods 201, 203 via a pair of bearing members 207, 209. The support frame 205 supports the bearing members 189, 191 on which the guide rods 185, 187 move, and the pneumatic cylinder 183, as shown. A Jac-uator TM screw jack 217 on the platform 200 provides for manual, vertical adjustment of the support frame 205, and thereby manual, vertical adjustment of the whole take-out mechanism 141. Thus, the extraction station 25 and take-out station 147 may be at different heights. Manual tuning of the height motion of the take-out mechanism 141 may be accomplished by the screw jack 217.

In operation of the take-out mechanism 141, the shaft 173 is rotated 180° by the pneumatic cylinder 171 about the axis 151 for movement of the jaw members 143, 145 into the extraction station 25. The shaft 163 is simultaneously rotated 180° to cause the jaw members 143, 145 to arrive at the extraction station 25 in an upright, and not upside-down, orientation. The drive rod 160 is then manipulated for causing the jaw members 143, 145 to close and grasp any molded article at the extraction station. Thereafter, the shafts 160, 173 rotate the jaw members 143, 145 into the take-out position 147. As desired, the shaft 181 and all driven structure thereabove, including the jaw members 143, 145, are driven downward by the cylinder 183. The jaw members are caused to open, for releasing the molded article onto a conveyor (not shown). As should now be apparent, movement of the shaft 181 may be selected for controlling the jaw member height either at the extraction station 25 or at the take-out station 147.

Figure 16:
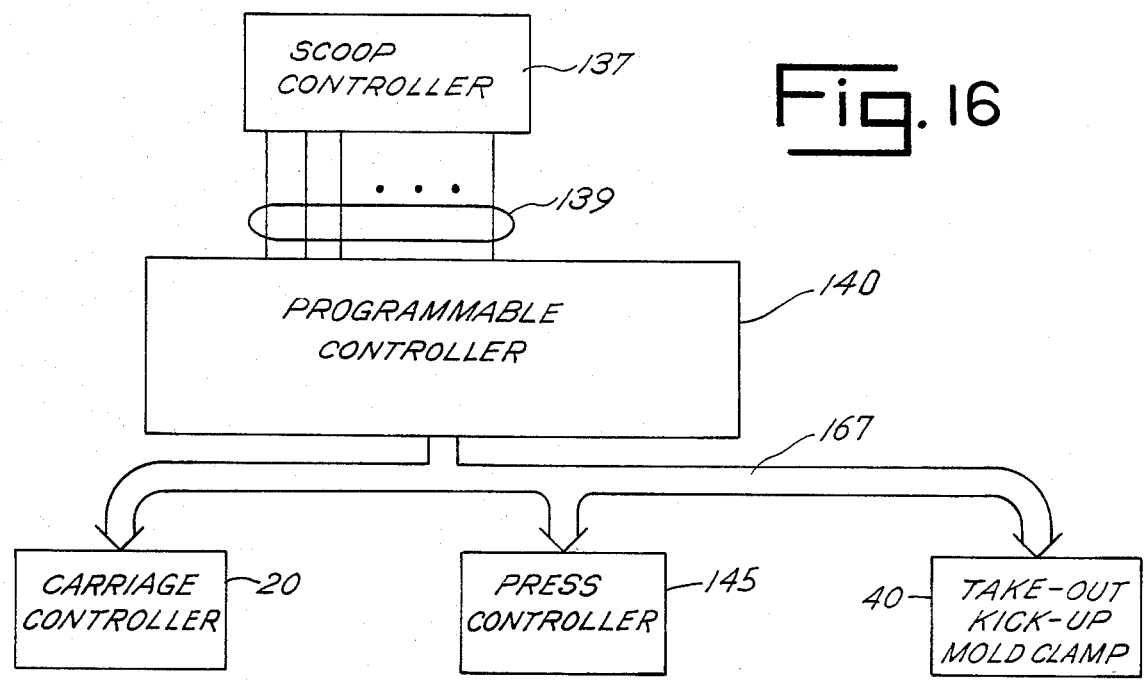
FIG. 16 is a first schematic view of the controls of the preferred embodiment of the invention.

Referring to FIG. 16, a scoop controller 137 monitors the operation of the scoop mechanism 26 (FIG. 1). The controller 137 serves to keep track of the particular press section 11 to which a charge is being distributed and responsively generates electrical timing signals along lines 139.

The signals on lines 139 are fed to a programmable, microprocessor based controller 140 which controls the various operations of the system. Controller 140 communicates with a carriage controller 20, a press controller 36, and the various pneumatic cylinders generally referenced by diagram block 40. The pneumatic cylinders of block 40 are the previously described cylinders of the kickup mechanism, take-out and mold clamp mechanisms.

Upon a charge entering the mold 17, the programmable controller 140 instructs the carriage controller 20 to slide the carriage 19 within the press section 11. Upon arrival of the mold 17 in its location beneath the plunger 60 (FIGS. 2a and 7), the programmable controller 140 feeds signals to the press controller 36 for instructing movement of the press head assembly 41 (FIG. 7) into engagement with the mold 17. After molding, the press controller 36 is instructed to retract the press head assembly, to retract the plunger 60 from the mold 17.

Upon completion of the pressing operation, the programmable controller 140 instructs the carriage controller 20 to drive the slide carriage 19, moving the mold 17 to the take-out station 25. Upon movement of the mold 17 to the take-out station 25, the appropriate kickup, mold clamp and take-out cylinders are actuated by the programmable controller 140 for transferring the finished article out of the mold 17. After the take-out process is completed, the carriage controller 20 is instructed to drive the carriage 19, returning the mold 17 to the charge receiving station 21.

Figure 17:
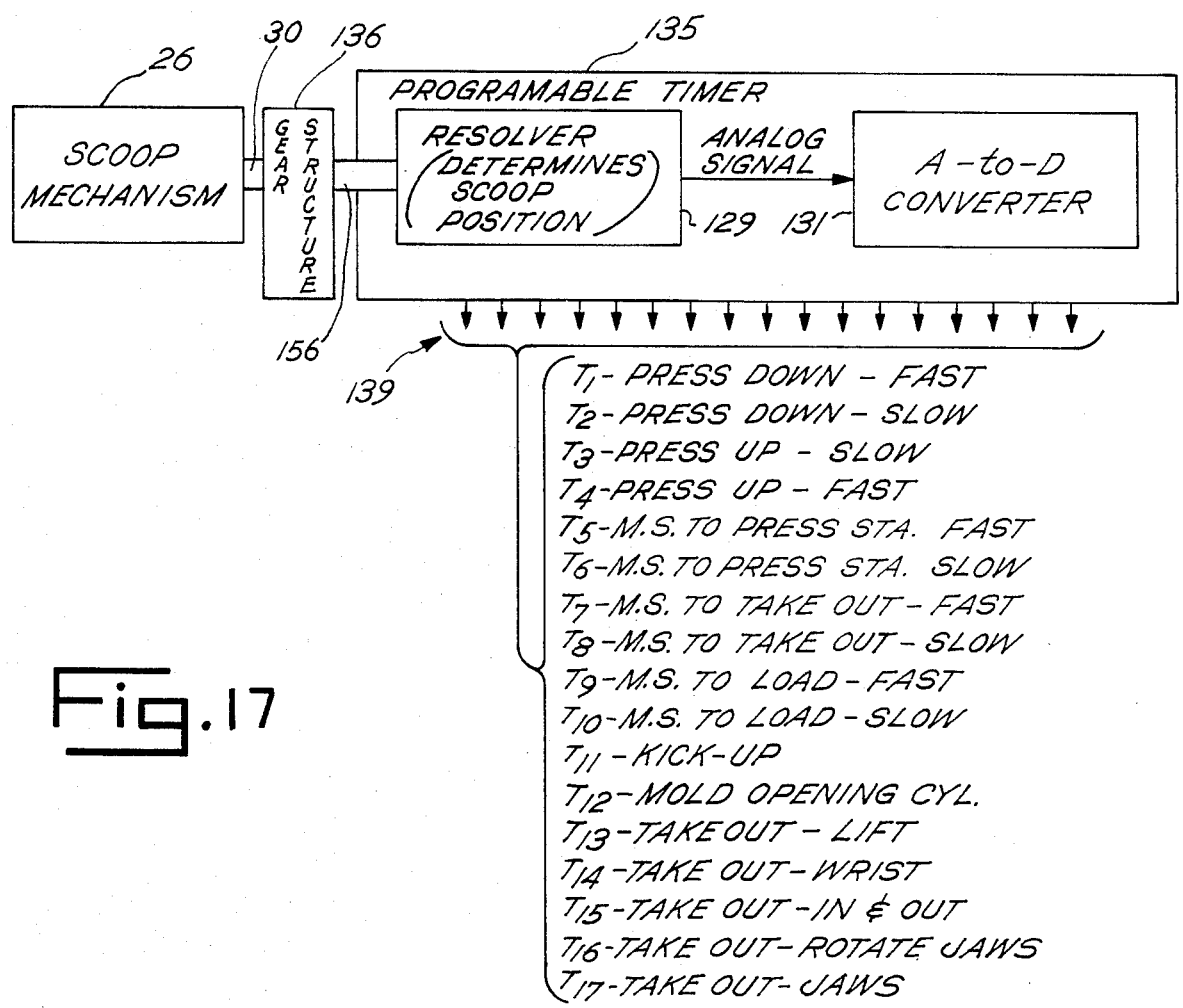
FIG. 17 is a second schematic view of the controls of the preferred embodiment of the invention.

Referring to FIG. 17, the scoop mechanism 26 (FIG. 1) is a conventional device in the glass manufacturing industry that may be purchased separately. It includes a timing shaft 30 which may be utilized in order to establish timing for other devices used in conjunction with the scoop mechanism.

The scoop controller 137 (FIG. 16) is comprised of a gearing structure 136 and a programmable timer 135. Generally, the scoop mechanism timing shaft 30 is turning at a ratio of 8:1. The gearing structure 136 is connected to the timing shaft 30 for driving a gearing output shaft 156 at a ratio of 1:1.

The programmable timer 135 is used to monitor the rotating shaft 156 and to generate timing signals along output lines 139. The timing signals are utilized to initiate the operations which need to be done during a single revolution of the scoop 29. For example, when the timing shaft is at 0°, it may be desired to have the mold 17 of a first of the section presses 11 in position to receive a change. Then, when the shaft is at 3°, it may be desired to move the mold 17 of the first section press into the molding station. Thus, the programmable timer 135 of FIG. 17 generates a number of outputs at different times in the 360° rotation of the timing shaft.

FIG. 17 shows, as an example, fifteen timing signals. As will suggest itself, more timing signals may be utilized to perform other operations where needed.

The programmable timer 135 is a separately obtainable element from the assignee of this application, Lynch Machinery, sold under the name P.E.T., Programmable Electronic Timer. As shown in FIG. 17, the timer 135 includes a resolver 129 which determines the position of shaft 156 and responsively generates an analog signal which varies in accordance with the extent of angular rotation of the shaft 156. This analog signal is converted to a digital signal by an A-to-D converter 131. A microprocessor (not shown) forms a part of the timer and monitors the digital signal output of the converter 131. The microprocessor is programmable for driving each of lines 139 to a logic ON state for generating signals T1 through T15 at the appropriate time. The signals T1 through T15 have an ON time initiated by a digital output of the converter 131 and terminated by another digital output of the converter. For example, T1 may be turned to ON at 3° of shaft rotation and turned to OFF at $4\frac{1}{2}°$ of shaft rotation. The particular operation to be performed during times T1 through T15 are listed in FIG. 17.

As understood, where eight press sections are being utilized, the timing signals will be generated on each respective line 139 every 45° of rotation of the shaft 156. The operations of one press section 11 may overlap the operations of another press section 11.

Referring to FIG. 18, the programmable controller 140 receives timing signals T1 through T15 via an input module 133 in order to perform various tasks depending upon the timing signal. The programmable controller 140 is preferably a Modicon 84 controller, manufactured by Gould, Inc., Andover, Mass. As understood, the Modicon 84 is programmable using a relay diagram language.

Additional input to the CPU may be made via an input module 134. Electrical signals fed to module 134 may be used as a safety device to override the timing instructions T1 through T15. For example, a position switch may be disposed along the path of the mold slide carriage 19 for generating an electrical signal to module 134 indicative of the slide carriage 19 reaching a particular position in its path of movement. Controller 140 may be programmed, for example, not to react to time signal T5 to move the mold plunger 60 to the press station if the controller has not first received an indication from the position switch that the mold slide carriage 19 is in its proper position.

The programmable controller 140 generates output signals along output control lines 138 in order to actuate the hydraulic and pneumatic cylinders discussed above. For example, a press head speed control module 125 generates a negative and a positive voltage in order to drive the press head either up or down. The amount of voltage generated by module 125 controls a control valve (not shown) which regulates the quantity of fluid driven into the hydraulic cylinder 51 which drives the press head.

Speed control module 125 receives one of four inputs from controller 140. The module 125 responds to each input by generating a voltage output of a particular preset magnitude. Each particular voltage can be adjusted as indicated by the four control knobs 121 at the top of the control module 125 in order to preset the amount of voltage to be generated depending upon which one of the four inputs is received by the press head module 125.

A similar speed control module 123 is used to drive the mold slide carriage 19. The speed control module 123 generates a positive or negative voltage in order to control a fluid control valve (not shown) to regulate the amount of fluid flowing in the hydraulic cylinder which controls the speed of the slide carriage 19.

The remaining output control lines 127, as indicated in FIG. 18, instruct pneumatic cylinder actuation. The signal along line 16 actuates the air valve which forces air into the cylinder to move the piston rod to its full extent. The particular cylinder actuated by lines 127 is indicated in FIG. 18.

The invention, and the manner and process of making and using it, are now described in such full, clear, concise and exact terms as to enable any person skilled in the art to which it pertains, to make and use the same. The best mode contemplated by the inventors of carrying out the invention is set forth. It is to be understood, of course, that the foregoing describes a preferred embodiment of the present invention and that modifications may be made therein without departing from the spirit or scope of the present invention as set forth in the appended claims. To particularly point out and distinctly claim the subject matter regarded as invention, the following claims conclude this specification.

We regard as invention and claim:

1. Apparatus for manufacturing molded articles including:
    a plurality of independent mold section presses, each said mold section press including,
    (i) a female mold,
    (ii) a male mold means, actuable for movement on said mold section press relative to said female mold to engage with said female mold at a mold station for molding an article,
    (iii) slide carriage means for moving said female mold horizontally, linearly to a separate charge receiving station from said mold station, said slide carriage means supporting said female mold on said mold section press, and
    (iv) charge delivery means on said mold section press for receiving and then guiding a charge to said female mold at said charge receiving station,
    scoop means for delivering individual charges as they are formed in succession to separate ones of said charge delivery means of said plurality of mold section presses, and
    control means for operating said scoop mechanism, said plurality of slide carriage means, and said plurality of male mold means for moving each said male mold means and its respective carriage means in synchronism with control of each other and of said scoop means and control means being operatively located with said plurality of mold section presses.

2. Apparatus as in claim 1 in which each said mold section press further includes
    (v) extraction means on said molded section press for extracting an article from said female mold at a separate extraction station; said slide carriage means further being means for moving said female mold horizontally, linearly to the extraction station from the mold station; and the control means further being means for further operating the plurality of said extraction means for moving each said extraction means in synchronism with control of its respective slide carriage means and male mold means, and of said scoop mechanism.

3. Apparatus as in claim 1 in which each said mold section press further includes
    (vi) kickout means on said mold section press for kicking out an article from said female mold at a kickout station; said slide carriage means further being means for moving said female mold horizontally, linearly to the kickout station from the mold station; and the control means further being means for further operating the plurality of said kickout means for moving each said kickout means in synchronism with control of its respective slide carriage means and male mold means, and of said scoop means.

4. A modular section molding press for manufacturing molded articles comprising:
    (i) a base structure,
    (ii) at least one female mold,
    (iii) a slidable carriage mounted on the base structure and having the female mold mounted thereon, the carriage adapted to move the female mold horizontally, linearly among a charge receiving station, a mold station and an extraction station, (iv) a press tower mounted on the base structure adjacent the slidable carriage, (v) at least one male mold mounted on the press tower for movement to and from engagement with the female mold at the mold station for molding articles, and (vi) control means for operating the slidable carriage and male mold, for moving the slidable carriage in synchronism with movement of the male mold.

5. A modular section molding press as in claim 4 further comprising:

(vii) a take-out mechanism mounted on the base structure adapted to grasp molded articles from the female mold at the extraction station, move such articles to a takeout station and release such articles at the take-out station;

the control means being further for operating the take-out mechanism, for moving the take-out mechanism in synchronism with movement of the slidable carriage and male mold.

6. A modular section molding press as in claim 5, the take-out mechanism including jaw members slidably movable relative to each other for grasping and releasing molded articles in succession, at least one at a time, means for pivotably supporting the jaw members about at least one axis, and means for pivoting the jaw members about the at least one axis for moving the jaw members to and from the extraction and take-out stations.

7. A modular section molding press as in claim 6, the means for pivotably supporting the jaw members about at least one axis being means for pivotably supporting the jaw members about two perpendicular axes, and the means for pivoting the jaw members about the at least one axis being means for pivoting the jaw members about the two perpendicular axes.

8. A modular section molding press as in claim 7, the means for pivotably supporting the jaw members including a first pivotable shaft along a first of the two perpendicular axes and a second pivotable shaft along a second of the two perpendicular axes, the jaw members being mounted to the first pivotable shaft and the first pivotable shaft being mounted to the second pivotable shaft.

9. A modular section molding press as in claim 8, the means for moving the jaw members including a means for pivoting the first pivotable shaft about the first axis and means for pivoting the second pivotable shaft about the second axis.

10. A modular section molding press as in claim 7, the take out mechanism further comprising means for moving the jaw members along a third axis.

11. A modular section molding press as in claim 4, the at least one female mold being a split mold of two mold halves pinned for pivotal movement on and to the carriage and having free ends, the press further comprising:

(vii) a mold clamp mechanism including, a motive drive means on the carriage, a pair of opposed drive arms pivotably secured to and driven by the drive means, each drive arm including camming and wedging surfaces, and each drive arm being linked to a free end of a mold half to pivot a mold half open and closed in response to driving of the drive means, fixed cam blocks on the carriage cooperating with the surfaces of the drive arms, the drive arms adapted to wedge against the fixed cam blocks in response to driving of the drive means to securely maintain closure of the mold halves against the forces of molding.

12. A mold clamp mechanism in a modular section molding press with a split mold, of two mold halves pinned for pivotable movement and having free ends, and a mold carriage, the mechanism comprising:

a motive drive means on the carriage, a pair of opposed drive arms pivotably secured to and driven by the drive means, each drive arm including camming and wedging surfaces, and each drive arm being linked to pivot a free end of a mold half to a mold half open and closed in response to driving of the drive means, fixed cam blocks on the carriage cooperating with the surfaces of the drive arms, the drive arms adapted to wedge against the fixed cam blocks in response to driving of the drive means to securely maintain closure of the mold halves against the forces of molding.

13. A take out mechanism in a modular section molding press with a base structure and a mold positionable at an extraction station, the take-out mechanism mounted on the base structure and adapted to grasp molded articles from the female mold at the extraction station, move such articles to a take-out station and release such articles at the take-out station, the take-out mechanism including jaw members slidably movable relative to each other for grasping and releasing molded articles in succession, at least one at a time, means for pivotably supporting the jaw members about two perpendicular axes, and means for pivoting the jaw members about the two perpendicular axes for moving the jaw members to and from the extraction and take-out stations, the two axes being a first axis and a second axis, the means for pivoting being means for pivoting both the jaw members and the first axis about the second axis and further being means for reversing the orientation of the jaw members relative to the first axis during pivoting about the first axis.

* * * * *